United States Patent [19]

Nahm et al.

[11] Patent Number: 5,226,961
[45] Date of Patent: Jul. 13, 1993

[54] HIGH TEMPERATURE WELLBORE CEMENT SLURRY

[75] Inventors: James J. W. Nahm; Harold J. Vinegar; John M. Karanikas; Reece E. Wyant, all of Houston, Tex.

[73] Assignee: Shell Oil Company, Houston, Tex.

[21] Appl. No.: 897,641

[22] Filed: Jun. 12, 1992

[51] Int. Cl.$^5$ .............................. C04B 07/32
[52] U.S. Cl. .................... 106/692; 106/672; 106/675
[58] Field of Search ............ 106/672, 692, 675

[56] References Cited

U.S. PATENT DOCUMENTS

| 2,880,096 | 3/1959 | Hurley . |
| 2,961,044 | 11/1960 | Shell . |
| 3,168,139 | 2/1965 | Kennedy et al. . |
| 3,180,748 | 4/1965 | Holgren et al. . |
| 3,499,491 | 3/1970 | Wyant et al. . |
| 3,507,332 | 4/1970 | Venable et al. . |
| 3,605,898 | 9/1971 | Harrison et al. . |
| 3,620,785 | 11/1971 | Root et al. . |
| 3,734,188 | 5/1973 | Root et al. . |
| 3,821,985 | 7/1974 | George . |
| 3,922,172 | 11/1975 | Crinkelmeyer et al. . |
| 4,200,153 | 4/1980 | Gallus . |
| 4,328,036 | 5/1982 | Nelson et al. . |
| 4,640,352 | 2/1987 | Van Meuers et al. . |
| 4,886,118 | 12/1989 | Van Meuers et al. . |
| 5,058,679 | 10/1991 | Hale et al. . |
| 5,060,287 | 10/1991 | Van Egmond . |
| 5,065,818 | 11/1991 | Van Egmond . |

FOREIGN PATENT DOCUMENTS 813951 5/1969 Canada .

Primary Examiner—Mark L. Bell
Assistant Examiner—Paul Marcantoni
Attorney, Agent, or Firm—Del S. Christensen

[57] ABSTRACT

A cement slurry is provided which is useful to cement wellbores in high temperature service. A high alumina cement is used. The density of the slurry is relatively low as a result of using a low density aggregate. In a preferred embodiment, the low density aggregate is graphite. The graphite additionally imparts a significantly improved thermal and electrical conductivity to the hardened cement.

13 Claims, No Drawings

HIGH TEMPERATURE WELLBORE CEMENT SLURRY

RELATED PATENT APPLICATIONS

This application is related to copending U.S. patent application Ser. Nos. 896,861 and 896,864.

1. Field of the Invention

This invention relates to wellbore cement slurries having low densities that are suitable for use in high temperature wellbores.

2. Background of the Invention

Cements suitable for service in relatively high temperature wellbores are disclosed in U.S. Pat. Nos. 3,180,748 and 3,507,332. These cements are high alumina cements and utilize as aggregates fused alumina, fused magnesium oxide, spinel, fused calcium oxide, fused dolomite, ilmenite, mullite, kyanite, silicon carbide, aluminum silicate, silica flour, ground fire clay brick and chrome ore. Although these cements, when set, are said to be useful at service temperatures up to and above 2500° F., most of the useful aggregates are very dense.

Suitable high alumina cement slurries must therefore be very dilute or used only over short intervals of the wellbore at one time due to the excessive pressure created by the hydrostatic head of the dense slurry. A dilute cement slurry results in, at best, a porous and relatively weak cured cement. It is also difficult to maintain the high density solids in suspension in the dilute solution. Solids settle from the dilute slurry resulting on a liquid water phase in top of a set cement. Cementing a wellbore in short intervals results in the cementing requiring excessive rig time, special tools and often results in cement jobs that fail due to, for example, poor isolation of zones. It would be desirable to have a high temperature cement which can be made from a relatively low density slurry that can be cured to become a strong wellbore cement.

U.S. Pat. Nos. 3,168,139 and 3,499,491 disclose the conversion of drilling muds to wellbore cement slurries. Conversion of drilling fluids to cement slurries eliminates the need to dispose of used muds, and eliminates the need to provide some additives, such as fluid loss and free water control additives, which are already present in the mud. Mud cements, being compatible with the mud, have the additional advantages of eliminating any need to use spacer fluids prior to cementing for improving mud displacement.

The mud based cements disclosed in these patents are generally portland type cements. Portland type cements are useful in most wellbore cementing applications, but are not acceptable when the service temperatures of the well are expected to exceed about 500° F. U.S. Pat. No. 491, at col 4, lines 26-37, includes high alumina cement as an acceptable cement, but does not address the problem of providing a high alumina cement having an acceptably low density. It would be useful to have a high temperature cement which could be made utilizing drilling mud and be of a sufficiently low density to allow cementing of long intervals of a wellbore.

In some processes to improve hydrocarbon production by heating the formation, it is highly desirable to have a high temperature cement which also has a high thermal conductivity. This will provide a faster and more efficient means of transferring heat from the wellbore to the formation.

It is therefore an object of the present invention to provide a wellbore cement slurry capable of being placed into a wellbore and cured into a wellbore cement useful at temperatures to about 2500° F. It is a further object to provide such a slurry having a density that can be varied sufficiently to permit cementing of long intervals of a wellbore at one time. In a preferred embodiment it is another object to provide such a slurry which can be prepared from drilling mud. In another preferred embodiment, it is an object to provide such a slurry which has a thermal conductivity of about $3 \times 10^{-3}$ cal/cm—° C.—sec or more.

SUMMARY OF THE INVENTION

These and other objectives are accomplished by a low density wellbore cement slurry composition suitable for cementing wellbores for high temperature service comprising:

a) a high alumina cement;

b) a low density aggregate selected from the group consisting of pozzolan hollow spheres, sepiolite, perlite, bubble alumina, fumed silica, graphite and mixtures thereof in an amount greater than about one quarter, by volume, of the solids in the cement slurry; and c) and a carrier fluid.

The carrier fluid is preferably a workover fluid or drilling mud.

The preferred low density aggregate is graphite. Graphite is particularly useful as an aggregate for cement slurry to be placed in a heat injection well. The heat injection well cement is in a reducing atmosphere, and the graphite therefore will not tend to oxidize. The graphite results in a cement having thermal and electrical conductivity considerably higher than conventional cements.

The high alumina cement in this slurry results in a set cement which is useful to temperatures of 2500° F.

DETAILED DESCRIPTION OF THE INVENTION

The high alumina cement of the present invention is a type of hydraulic cement that is commercially available from many sources. Exemplary are: from Lafarge Calcium Aluminates, "FONDU" (39% $Al_2O_3$), "SECAR 41" (41% $Al_2O_3$), "SECAR 51" (51% $Al_2O_3$), "SECAR 71" (71% $Al_2O_3$), "SECAR 80" (80% $Al_2O_3$); from Lehigh Portland Cement Co., "LUMNITE" (47% $Al_2O_3$), "REFCON" (57% $Al_2O_3$); and from Alcoa, CA-14 (70% $Al_2O_3$) and CA-25 (80% $Al_2O_3$). The active ingredients in these cements are compounds of calcium oxide and alumina having principal mineralogical phases of monocalcium aluminate, calcium bialuminate or similar compounds. The preferred high alumina cements contain more than about 50 wt % $Al_2O_3$.

The amount of cement in the slurry of the present invention is greater than about 40 pounds per barrel of slurry. Less cement will result in a cured cement having inferior strength. Aggregates are useful in cementing slurries to impart strength to the set cement while reducing the amount of more costly materials. Aggregates having a high alumina content improve the set cement's high temperature durability, but generally have high densities. They result in relatively high density slurries. High alumina aggregates may therefore be utilized in the present invention, but are preferably utilized with a sufficient amount of low density aggregate to result in a slurry density of about 18 pounds per gallon or less. The weight ratio of total aggregate to cement is typically within the range of about 1:5 to about 5:1. Significantly more aggregate will result in a set cement with unacceptably low strength.

Examples of acceptable high alumina aggregates are fused white alumina (99% $Al_2O_3$, Sp.Gr.3.95), ground calcinated bauxite (88% $Al_2O_3$, Sp.Gr. 3.8), "MULCOA 90" (90% $Al_2O_3$, Sp.Gr. 2.9), "MULCOA 70" (70% $Al_2O_3$, Sp.Gr. 2.9), "MULCOA 60" (60% $Al_2O_3$, Sp.Gr. 2.8), and "MULCOA 47" (47% $Al_2O_3$, Sp.Gr. 2.7). The "MULCOA" aggregates are aluminum oxide containing aggregates available from C. E. Minerals.

Examples of acceptable low density aggregates are pozzolan hollow spheres, sepiolite, perlite, bubble alumina, fumed silica, graphite and mixtures thereof.

The preferred low density aggregate is graphite when the cured cement is for service in a reducing environment. Wells used to inject heat into hydrocarbon containing formations generally are in a reducing environment. Graphite is preferred due to its high thermal conductivity and relatively low cost. High thermal conductivity is particularly important when the high temperature cement is used in a heat injection well for conductively heating a formation to recover hydrocarbons. Such processes are taught in U.S. Pat. Nos. 4,640,352, 4,886 118 and copending U.S. patent application Ser. Nos. 896,861 and 896,864. The thermal conductivity of set cement from the slurry of this invention containing graphite as an aggregate can be as high as $4 \times 10^{-3}$ cal/cm-sec-° C. for a cement from a slurry containing 4 pounds of graphite per pound of cement with no other aggregates. This slurry was of a density of about 13.9 lbs/gal. A cement with a high thermal conductivity significantly increases the amount of heat that can be transferred into the formation from a heat injection source operating within the cement.

Graphite is available in three types; amorphous, crystalline and synthetic. Amorphous graphite is about 80 to about 85 percent by weight carbon and has a specific gravity of about 2.2. Crystalline graphite is about 100% carbon and has a specific gravity of about 2.26. Amorphous graphite has the microcrystalline graphite crystal structure but appears to be amorphous. The different forms also have different effects on the viscosity of slurries. This is due to differing particle electrical charges and chemical contaminants. Thus different forms may be preferred for different slurry requirements. In general, amorphous graphite can be incorporated into the slurry at higher concentrations without making the slurry too thick to be pumpable.

Graphite differs from coke or other forms of carbon in the crystalline structure of the carbon. The crystalline structure of graphite imparts a higher thermal conductivity than carbon in forms other than diamond. Coke has a low thermal conductivity, and is even more difficult than graphite to incorporate in slurries in significant quantities due to the increased surface area of coke.

Graphite also greatly increases the electrical conductivity of the set cement. This property could be useful if it is desired to electrically heat injection wells for recovery of hydrocarbons from a hydrocarbon bearing formation. The cement itself could be used as a heating element.

High alumina cement slurries containing large amounts of graphite have a relatively high apparent viscosity and cannot be easily pumped without the inclusion of a dispersing agent. Many known dispersing agents can be used to make the slurry easily pumpable when the graphite content is at or below about 100 pounds per barrel of slurry. Some examples are chrome-free "SPERSENE" available from MI Drilling Fluids, low and ultra low viscosity grades of sodium salts of carboxymethyl cellulose, and polyvinyl alcohol having a weight average molecular weight of between about 13,000 to about 23,000. The most effective of these dispersing agents has been found to be an ultra low viscosity sodium salt of carboxymethyl cellulose. A slurry of 59 parts "SECAR-51", 286 parts No. 620 grade graphite from Dixon Ticonderoga Co., Vero Beach, Fla., (an amorphous graphite), 195 parts of fresh water and 3.0 parts of a ultra low viscosity sodium salt of carboxymethyl cellulose was prepared and was of a pumpable viscosity. This slurry was also cured to form a cured cement having a relatively low porosity (45%) and a high electrical and thermal conductivity.

Retarders that are useful with graphite containing cement slurries include magnesium chloride and magnesium sulfate. These retarders are effective to extend curing times for high alumina cements in the presence of significant amounts of graphite. About two pounds of $MgCl_2.6H_2O$ per barrel of slurry are required to achieve an initial set time of over about twelve hours, and about two pounds of magnesium sulfate are required to achieve an initial set time of about thirty eight hours. In contrast, the slurry sets in about forty four minutes with no retarder and citric acid and sodium citrate at concentrations of about two pounds per barrel of slurry resulted in set times of less that three hours.

When high temperature durability, high temperature strength and high thermal or electric conductivity are required, a high alumina aggregate can be used with a smaller size graphite aggregate. The mean average size of the high alumina aggregate is preferably greater than about five times the mean average size of the graphite. The high alumina aggregate, being larger, provides strength, while the smaller size graphite fills between the high alumina aggregates to provide thermal and electrical conductivity.

Set retarders generally known in the art may be useful for the practice of the present invention when aggregates other than graphite are utilized.

The slurry of the present invention is preferably a drilling fluid based slurry as disclosed in U.S. Pat. Nos. 3,168,139 and 3,499,491. Muds such as seawater/lignosulfonate, seawater/gypsum, sodium chloride/partially hydrolyzed polyacrylamide, emulsion-high lime, low lime, and low lime/salt/alcohol muds can be used a base mud for the slurry of the present invention. The use of a drilling fluid as the base for the cement slurry is preferred because of the elimination of the need to dispose of the mud, improved compatibility of the cement slurry with the drilling fluids, and savings in cement slurry additives. Bentonite and other low density clays present in the drilling fluids also serve as additional low density aggregate in the present invention.

EXAMPLES

Table 1 below lists compositions of slurries prepared to demonstrate the present invention. Each slurry had a density of about 13.5 pounds per gallon. Slurry 1 contains high alumina cement (SECAR 80), and a high density high alumina content aggregate (MULCOA 47), in a drilling mud containing 10 pounds per barrel of bentonite. Slurries 2, 3 and 4 each also contained an amorphous graphite (grade 620 from Dixon Ticonderoga Co.), and $MgCl_2.6H_2O$ as a curing retarder. Table 1 includes the plastic viscosity, yield point and gel strength of the slurries, the initial set times of the slurries and the compressive strength of cements from each of the slurries. Slurry 4 additionally contained 1.26 pounds per barrel of slurry of CFR-3, a dispersant available from Halliburton Company, Houston, Tex. Slurry 4 was too thin for measurement of plastic viscosity, yield point and gel strength. It can be seen from Table 1 that graphite can be incorporated into a pumpable high alumina cement having an acceptable compressive strength.

TABLE 1

| Slurry | 1 | 2 | 3 | 4 |
|---|---|---|---|---|
| Mud, Bbls. | 0.672 | 0.649 | 0.615 | 0.649 |
| Secar 80, Lbs. | 81.8 | 168 | 104 | 168 |
| Mulcoa 47, Lbs. | 245 | 83.9 | 122 | 83.9 |
| Graphite, Lbs. | 0 | 83.9 | 122 | 83.9 |
| $MgCl_2.6H_2O$, Lbs. | 0 | 1.5 | 1.5 | 1.5 |
| CFR-3, Lbs. | 0 | 0 | 0 | 1.26 |
| Plastic Viscosity, cp. | 14 | 23 | 44 | N/A |
| Yield Lbs/100 ft$^2$ | 32 | 104 | 180 | N/A |
| Gel Strengths Lbs/100 ft$^2$— | | | | |
| 10 sec. | 18 | 40 | 78 | N/A |
| 10 min. | 20 | 43 | 82 | N/A |
| Set Time Hr:Min | 5:50 | 44:20 | 14:23 | N/A |
| Compressive Strength, lb/in$^2$ | 261 | 650 | 280 | 871 |

A test heat injection well was cemented into a hydrocarbon bearing formation demonstrating the usefulness of the low density slurry of the present invention. An electrically powered heat source was placed inside a tubing that was cemented within a wellbore. The cement slurry comprised 47 pounds of water and 11 pounds of "SPHERELITE" (pozzolan hollow spheres available from Halliburton Company, Houston, Tex.) for each 94 pound bag of "LUMNITE" cement. The well was heated to 1400° F. and maintained at that temperature for about six months. A sample of the cement was then taken by overcoring.

A sample of set cement of the above recipe was found to have a compressive strength of 1070 psi after heat aging at 1400° F. in the laboratory for two and one half days and was of a 13.8 pounds per gallon density. The sample recovered from the wellbore was of a 17.9 pounds per gallon density and had a compressive strength of about 14,000 psi and had a low permeability, 0.16 md. Carbon from formation hydrocarbons appeared to have filled the pores of the cement and significantly increased the strength of the set cement.

A pumpable slurry of high graphite cement was prepared containing the composition listed in Table 2 below.

TABLE 2

| Water, lbs | 150 |
|---|---|
| SECAR-51, lbs | 33 |
| DIXON-620, lbs | 167 |
| CMC*, lbs | 1 |
| Density, lb/gal | 12.4 |
| Plastic Viscosity, cp | 73 |
| Yield Point, lb/100 ft$^2$ | 8 |
| Gel Strength-lb/100 ft$^2$ | |
| 10 sec. | 8 |
| 10 min. | 51 |

*CMC is chemical grade ultra low viscosity carboxymethyl cellulose from Aldrich Chemical Company.

The composition of Table 2 set to become a highly heat conductive cement. The set cement from the slurry of Table 2 would not be acceptable when a high strength set cement is required, but provided an excellent highly heat conductive and electrical conductive cement for applications not requiring high strength cement. The cement would be serviceable of temperatures of 2500° F. and more.

Three samples of graphite containing cement slurry were prepared and cured to determine the thermal conductivity of such cured cements. The first graphite containing cement slurry contained 100 grams of a crystalline graphite, 25 grams of SECAR-51 high alumina cement and 100 grams of water. The slurry density was 12.3 pounds per gallon. The set cement had a thermal conductivity of about $4.1 \times 10^{-3}$ cal/cm-sec-° C. The second graphite containing cement slurry contained 220 grams of Dixon No. 620 amorphous graphite, 45 grams of SECAR-51 high alumina cement, 150 grams of water and 3.0 grams of ultra low viscosity carboxyl methyl cellulose. The slurry had a density of about 12.9 pounds per gallon. The set cement had a thermal conductivity of about $4.0 \times 10^{-3}$ cal/cm-sec-° C. The third sample contained solids of 25% wt Dixon No. 620 amorphous graphite, 25% wt of MULCOA 47 high alumina aggregate and 50% wt of SECAR-80 high alumina cement. The slurry contained an amount of water sufficient to achieve a slurry density of about 13.5 pounds per gallon. The slurry also contained some magnesium chloride as a dispersant. The set cement had a thermal conductivity of about $3.0 \times 10^{-3}$ cal/cm-sec-° C.

The thermal conductivities of the set cements from these low density slurries were about four to ten times the thermal conductivities of high alumina cements containing other low density aggregates.

We claim:

1. A low density wellbore cement slurry composition suitable cementing wellbores for high temperature service comprising:
   a) a high alumina cement in an amount of about 40 pounds per barrel of slurry or greater;
   b) graphite in an amount greater than about one quarter, by volume, of the solids in the cement slurry; and
   c) and a carrier fluid comprising drilling mud.

2. The slurry of claim 1 wherein the density of the slurry is between about 11 and about 18 pounds per gallon.

3. The slurry of claim 1 wherein the density of the slurry is between about 12 and about 14 pounds per gallon.

4. The slurry of claim 1 wherein the drilling mud has a density of between about 9 and about 11 pounds per gallon.

5. The slurry of claim 4 wherein the slurry further comprise a high alumina aggregate.

6. A low density wellbore cement slurry composition suitable for cementing a wellbore for high temperature service comprising:
   a) a high alumina cement in an amount of about 40 pounds per barrel of slurry or greater;
   b) graphite in an amount greater than about one quarter by volume of the solids of the slurry; and
   c) a carrier fluid.

7. The slurry of claim 6 wherein the graphite is an amorphous graphite.

8. The slurry of claim 7 further comprising an amount of ultra low viscosity sodium salt of carboxymethyl cellulose effective to render the slurry pumpable.

9. The slurry of claim 6 wherein the carrier fluid comprises workover fluid.

10. The slurry of claim 6 further comprising an amount of a retarder selected from the group consisting of magnesium chloride and magnesium sulfate effective to prevent hardening of the slurry for a time period of greater than about 12 hours.

11. The slurry of claim 6 wherein cement produced from the slurry has a thermal conductivity greater than about $3 \times 10^{-3}$ cal/cm-sec-° C.

12. The slurry of claim 1 wherein the amount of graphite in the slurry is between about 80 and about 250 pounds per barrel of slurry.

13. The slurry of claim 12 wherein the amount of graphite is/ about 240 pounds per barrel of slurry and the amount of high alumina cement is about 50 pounds per barrel of slurry.

* * * * *